United States Patent
Horikawa et al.

(10) Patent No.: US 7,014,585 B2
(45) Date of Patent: Mar. 21, 2006

(54) BLADE-TYPE CHAIN TENSIONER SYSTEM

(75) Inventors: Yasuo Horikawa, Nabari (JP); Toru Okazaki, Nabari (JP); Hiroyoshi Mitsuhashi, Nabari (JP)

(73) Assignee: BorgWarner Morse TEC Japan K.K., Nabari (JP)

( * ) Notice: Subject to any disclaimer, the term of this patent is extended or adjusted under 35 U.S.C. 154(b) by 217 days.

(21) Appl. No.: 10/317,900

(22) Filed: Dec. 12, 2002

(65) Prior Publication Data

US 2003/0125144 A1 Jul. 3, 2003

(30) Foreign Application Priority Data

Dec. 28, 2001 (JP) .............................. 2001-400353

(51) Int. Cl.
*F16H 7/08* (2006.01)
*F16H 7/18* (2006.01)

(52) U.S. Cl. ...................................... 474/111; 474/140
(58) Field of Classification Search ................ 474/111, 474/140, 101, 109, 133, 135, 138
See application file for complete search history.

(56) References Cited

U.S. PATENT DOCUMENTS

| | | | | | |
|---|---|---|---|---|---|
| 3,276,282 | A | * | 10/1966 | Gair | 474/111 |
| 5,286,234 | A | * | 2/1994 | Young | 474/111 |
| 5,938,522 | A | * | 8/1999 | Jagusch et al. | 452/193 |
| 2002/0115511 | A1 | * | 8/2002 | Tada | 474/111 |

* cited by examiner

*Primary Examiner*—Marcus Charles
(74) *Attorney, Agent, or Firm*—Brown & Michaels, PC; Greg Dziegielewski

(57) ABSTRACT

The present invention provides a blade-type tensioner system for a chain that can easily improve spring properties. A blade-type tensioner includes a blade shoe and a blade spring positioned on the back side of chain sliding surface of the blade shoe so as to impart tension to a chain through the blade shoe. The blade shoe is pivotably supported around a shoulder bolt inserted into a proximal end portion of the blade shoe, and a distal end portion of the blade shoe is slidably supported on a supporting face provided in the engine. The distal end portion of the blade shoe contacts a flat, first supporting face at a point. When tension in the chain is increased, the distal end portion contacts a concave, second supporting face at a point which is continuous with the first supporting face.

7 Claims, 8 Drawing Sheets

BLADE-TYPE CHAIN TENSIONER SYSTEM

BACKGROUND OF THE INVENTION

1. Field of the Invention

The present invention relates to a tensioner for an endless chain power transmission system. More particularly, to a chain tensioner system with a blade tensioner for imparting tension to a chain that drivingly connects a driven shaft to a driving shaft.

2. Description of Related Art

In an automotive engine, a blade-type tensioner has been used as a tensioner to impart tensioning force to an engine timing chain or a drive chain for an auxiliary such as an oil pump and the like. A blade-type tensioner is comprised of a blade shoe having an arcuately curved chain sliding surface and a leaf-spring-shaped blade spring provided on the opposite side of the chain sliding surface of the blade shoe to apply a spring force to the blade shoe. A proximal end portion of the blade shoe is rotatably supported around a supporting shaft inserted thereinto. A distal end portion of the blade shoe is slidably supported on a supporting surface provided discretely from the blade shoe.

In operation, a chain runs along the chain sliding surface of the blade shoe. A resilient force caused by deformation of the blade shoe and the blade spring presses on the chain, thereby maintaining the chain tensioning force.

When resonance occurs with the blade-type tensioner an adequate compressive force may not be applied to the chain by the tensioner, thereby causing tooth jumping of the chain. Tooth jumping will change the relative timing of the driving and driven shafts, and in some engines could cause valve damage or retard the ignition timing of the engine. Therefore, there is a need to prevent the blade tensioner from causing resonance in the normal rotational speed of the engine. In order to prevent resonance, the resonant frequency of the blade tensioner may be made higher than the usual rotational speed of the engine by enlarging the spring rate of the blade spring.

In a conventional blade tensioner however, when enlarging the spring rate by increasing the number of the blade springs or increasing the thickness of each blade spring, difficulties arise in assembling the blade spring in to the blade shoe. Therefore, in a prior art blade tensioner, it is not easy to improve the spring properties.

SUMMARY OF THE INVENTION

A blade tensioner system includes a blade shoe and a leaf-spring-shaped blade spring. The blade shoe is formed of a shoe body with an arcuately curved chain sliding surface, a proximal end portion provided on a proximal side of the shoe body, and a distal end portion provided on a distal end side of the shoe body. The blade spring is disposed on the opposite side of the chain sliding surface of the blade shoe so as to impart a compressive force to the chain through the blade shoe. The proximal end portion of the blade shoe is rotatable around a supporting shaft inserted thereinto. Also, in an engine, first and second supporting surfaces are provided to slidably support the distal end portion of the blade shoe. The second supporting surface is a concavely circular arc that is continuous with the first supporting surface, or a flat surface that is continuous with the first supporting surface through a concavely circular arc that extends in a direction intersecting the first supporting surface. The distal end portion of the blade shoe has a convexly circular arc that contacts either the first or second supporting surface, and is slidably supported by either the first or second supporting surface in the engine.

When tension in the chain increases and the compressive force of the chain onto the blade tensioner increases, the blade shoe deforms and the arcuately curved convex surface of the distal end portion of the blade shoe comes into contact with the second supporting surface. At this time, since the second supporting surface is a concavely arcuately curved surface that is continuous with the first supporting surface, or a flat surface that is continuous with the first supporting surface through the concavely arcuately curved surface extending in a direction intersecting the first supporting surface, the amount of deformation of the blade shoe becomes greater and the amount of bending of the blade spring increases. In this case, the spring properties of the blade tensioner may be improved with ease by simply changing the shape of the second supporting surface relative to the first supporting surface. By changing the shape of the second supporting surface, the resilient force of the blade spring can be made greater. In this case as well, the spring properties of the blade tensioner may be improved with ease by simply changing the shape of the second supporting surface relative to the first supporting surface.

When the chain tension decreases, the compressive force that is applied by the chain to the blade tensioner decreases, the blade shoe elastically deforms toward its original position and the arcuately curved convex surface of the distal end portion of the blade shoe travels toward the first supporting surface. At this time, the blade spring shows a decrease in deformation, as compared to where the arcuately curved convex surface of the distal end portion of the blade shoe is still supported by the second supporting surface after elastic deformation toward its original position. The decrease in the resilient force of the blade spring is smaller relative to the returning deformation of the blade spring. In this way, the spring properties of the blade tensioner can be further improved.

The term "continuous" means to be mathematically continuous. That is, there are no discontinuities such as stepped portions or the like between the first and second supporting surfaces, and the first and second supporting surfaces are smoothly connected to each other. The term circular meaning a segment of a circle.

In an alternative embodiment, the blade tensioner is installed in a "set position" inside an engine, where the circular, convex surface of the distal end portion of the blade shoe is slidably supported on the first supporting surface. When tension in the chain increases from this "set position," the circular, convex surface of the distal end portion of the blade shoe comes into contact with a second supporting surface. The second supporting surface is a circular, concave surface that is continuous with the first supporting surface or alternatively a flat surface that extends in a direction intersecting the first supporting surface continuous with the first supporting surface via a circular, concave surface. When a contact point of the circular, convex surface of the distal end portion of the blade shoe is transferred from the first supporting surface to the second supporting surface, the amount of deformation of the blade spring increases, thereby increasing the resilient force of the blade spring.

In a third embodiment, the first supporting surface may be a flat surface. In a fourth embodiment, the first supporting surface may be a circular, convex surface. When the chain elongates during operation in this embodiment, the vertical resistance force applied from the first supporting surface to the distal end portion of the blade shoe is enlarged, thereby improving a damping performance relative to the chain.

According to a fifth embodiment, the blade tensioner is installed into an engine in a "set position", and a contact point between the circular, convex surface of the distal end portion of the blade shoe and the first supporting surface is located at an inflection point between the circular, convex surface of the first supporting surface and the circular, concave surface of the second supporting surface.

In a sixth embodiment, the blade tensioner is applied to a camshaft timing system of an engine, where the drive shaft is a crankshaft and the driven shaft is a camshaft.

In a seventh embodiment, the blade tensioner is applied to an auxiliary drive system of an engine, where the drive shaft is a crankshaft and the driven shaft is an auxiliary drive shaft.

DETAILED DESCRIPTION OF THE INVENTION

Figure 1:
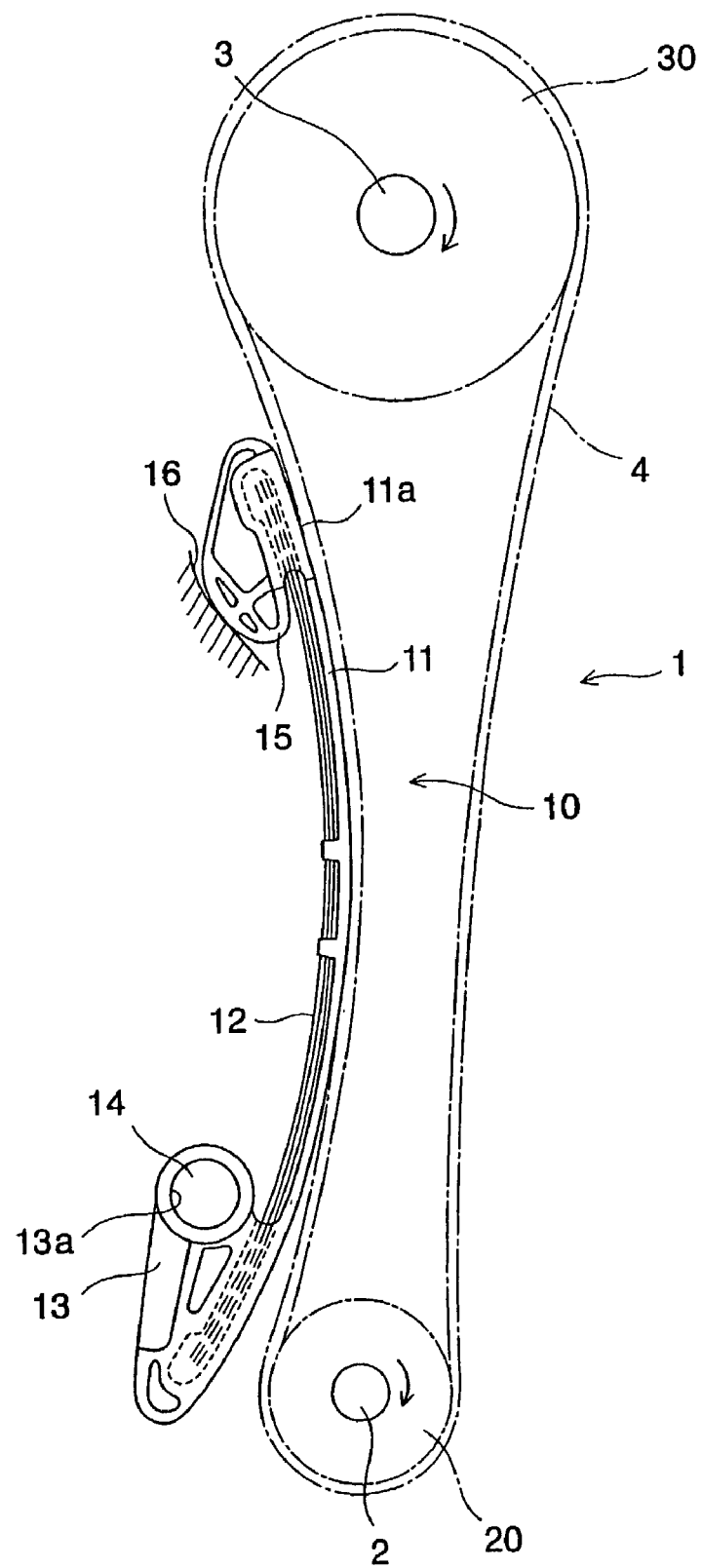
FIG. 1 shows a schematic side view of an engine camshaft timing system incorporating a blade tensioner according to an embodiment of the present invention, showing a set position immediately after the blade tensioner has been installed into an engine.
Figure 3:
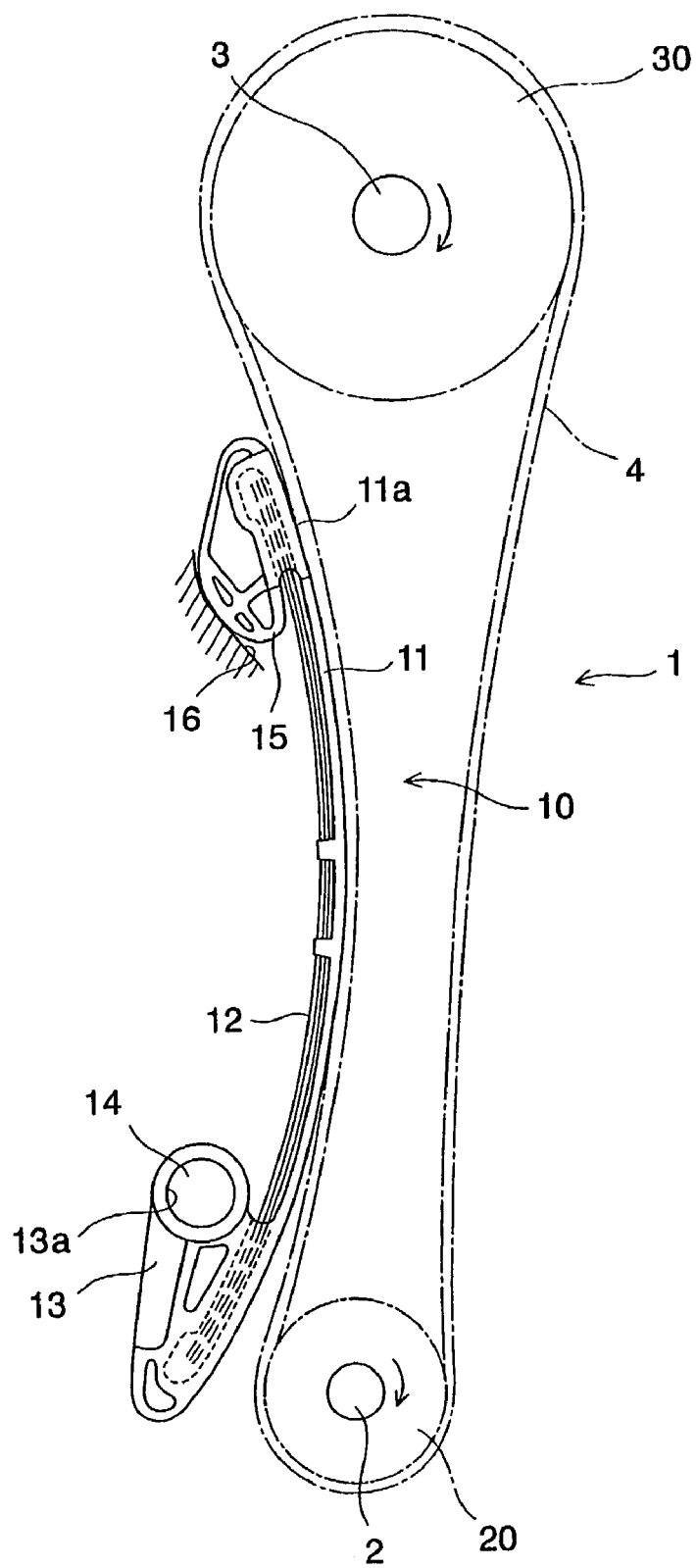
FIG. 3 shows a schematic side view of an engine camshaft timing system incorporating a blade tensioner according to an embodiment of the present invention, showing a state where tension in the chain has been increased from the state of the set position of FIG. 1.

FIGS. 1 and 3 show an engine camshaft timing system incorporating a blade-type tensioner according to an embodiment of the present invention. FIG. 1 illustrates a "set position" immediately after a blade-type tensioner has been installed into an engine, and FIG. 3 illustrates a state where chain tension has been increased from the "set position" in FIG. 1.

As shown in FIGS. 1 and 3, a camshaft timing system 1 is comprised of a crank sprocket 20 mounted onto a crankshaft (or a drive shaft) 2, a cam sprocket 30 mounted onto a camshaft (or a driven shaft) 3, and a timing chain 4 wrapped around these sprockets 20, 30 to transmit power of the crankshaft 2 to the camshaft 3. In the drawing, arrow marks indicate directions of rotation of the crankshaft 2 and the camshaft 3, respectively.

On the slack side of the timing chain 4, a blade-type tensioner 10 is provided. The blade tensioner 10 includes an arcuately curved, plastic blade shoe 11, and a plurality of leaf-shaped blade springs 12 provided and laminated on the back side of the chain sliding surface 11a of the blade shoe 11 so as to impart tension to the chain 4 via the blade shoe 11.

The proximal end portion 13 of the blade shoe 11 has a pivot hole 13a into which a shoulder bolt (or a supporting shaft) 14 is inserted. The shoulder bolt 14 is fitted into a threaded hole formed in an engine cylinder block (not shown), making the blade shoe 11 rotatable around the shoulder bolt 14.

The distal end portion 15 of the blade shoe 11 contacts and slides on the supporting surface 16 provided in the engine. The blade tensioner system of the present invention is structured by the blade tensioner 10 and the supporting surface 16.

Figure 2:
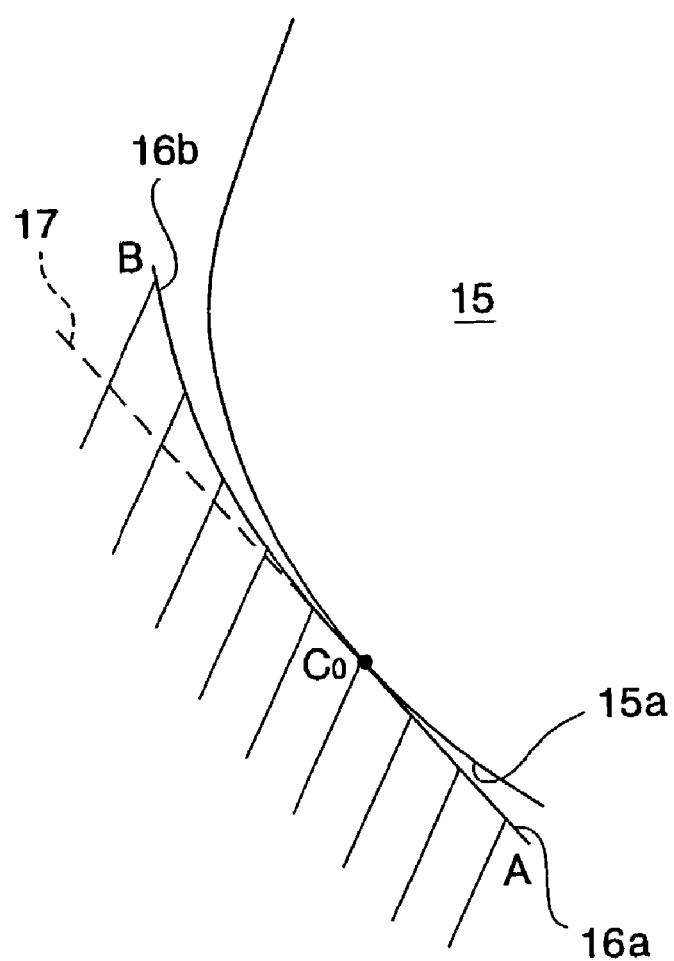
FIG. 2 shows an enlarged view of a portion of FIG. 1.

As shown in FIG. 2, an enlarged view of a portion of FIG. 1, a circular, convex surface 15a comprising the distal end portion 15 of the blade shoe 11 is in contact with the supporting surface 16 at point $C_0$. A surface AB, which composes the supporting surface 16 is formed of a first supporting surface 16a linearly extending through a line segment $AC_0$ and a concavely circular, second supporting surface 16b that extends from point $C_0$ to point B and is continuous with the first supporting surface 16a. Here the term circular means a segment of a circle. In addition, broken line 17 indicates a supporting surface of prior art, which extends linearly from point $C_0$ along an extended line of the first supporting surface 16a. Here, the term "continuous" means to be mathematically continuous. That is, there are no discontinuities such as stepped portions or the like between the first and second supporting surfaces 16a, 16b, and the first and second supporting surfaces 16a, 16b are smoothly connected to each other.

From the state shown in FIG. 1, the tension in the chain increases due to the resonance of the blade tensioner or an elongation of the center distance due to thermal expansion, as a result, the compressive force of the chain on the blade tensioner 10 increases. As a result, as shown in FIG. 3, the blade tensioner 10 deforms in such a manner as to enlarge its radius of curvature. At this time, the proximal end portion 13 of the blade shoe 11 rotates around the shoulder bolt 14 and the distal end portion 15 of the blade shoe 11 slides upwardly along the supporting surface 16.

Figure 4:
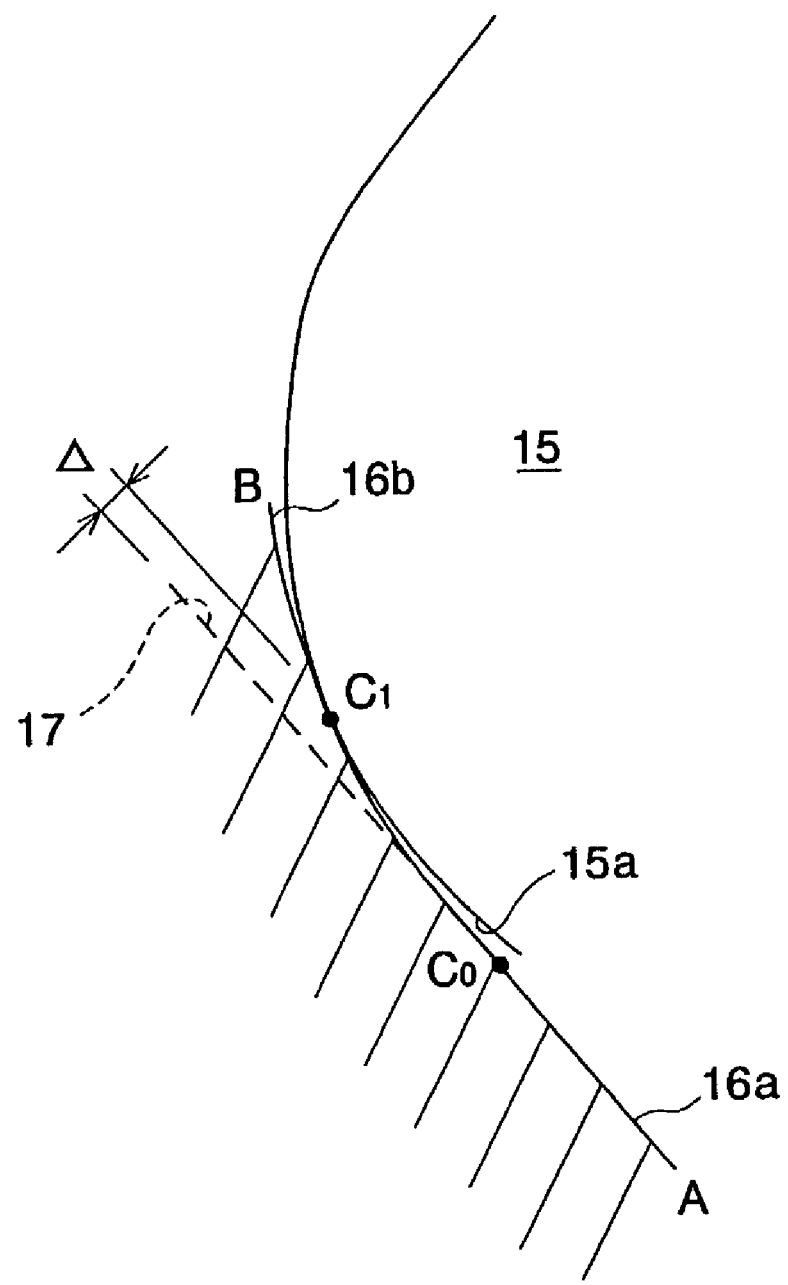
FIG. 4 shows an enlarged view of a portion of FIG. 3.

As shown in FIG. 4, an enlarged view of a portion of FIG. 3, the circular, convex surface 15a of the distal end portion 15 of the blade shoe 11 is in contact with point $C_1$ on the second supporting surface 16b. In FIG. 4, the distance between point $C_1$ and the supporting surface 17 of the prior art is designated Δ. In this embodiment, the amount of deflection of the blade shoe, and the amount the blade spring is increased by Δ, as compared with the state supported on the supporting surface 17 of the prior art. Thus, the resilient force of the blade spring is made greater, thereby improving spring properties of the blade tensioner. In this case, since the improvement in spring properties is achieved by simply altering the shape of the supporting surface, the spring properties can be improved with ease.

Figure 5:
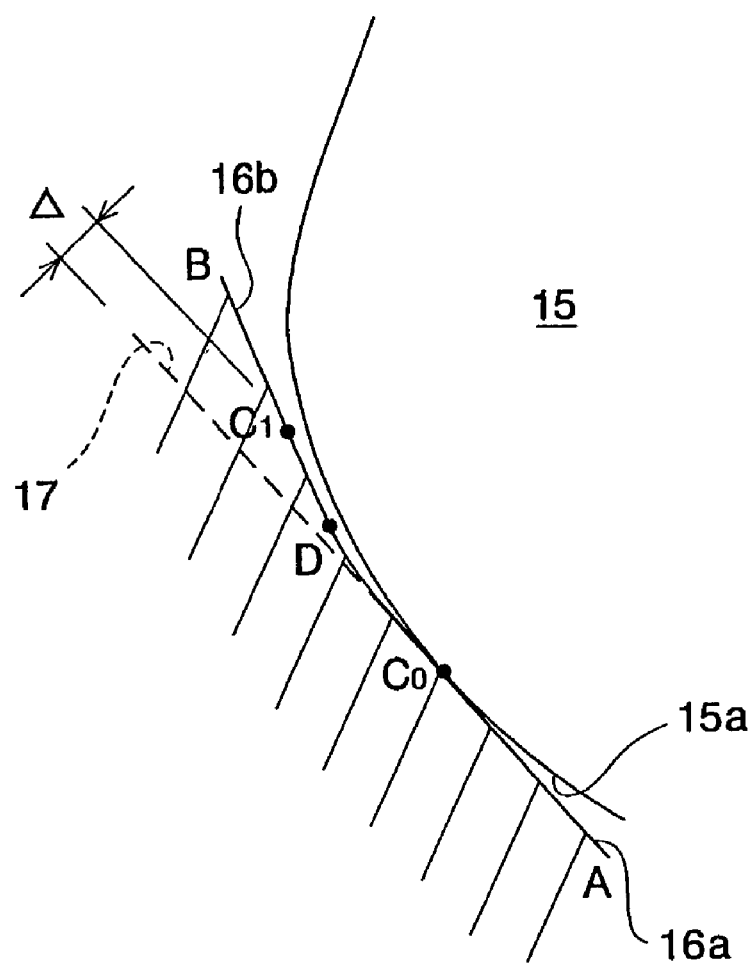
FIG. 5 shows an alternative embodiment of the present invention.

Referring to FIG. 5, in an alternative embodiment, the surface AB composing the supporting surface 16 is formed of a first supporting surface 16a extending linearly between point A and point $C_0$, the circular, concave surface that extends between point $C_0$ and point D is continuous with the first supporting surface 16a, and a flat surface that extends linearly between point D and point B that is continuous with the circular, concave surface. A second supporting surface 16b is formed of a circular, concave surface that is continuous with the first supporting surface 16a, and a flat surface that is continuous with this circular, concave surface. The circular, convex surface 15a of the distal end portion 15 of the blade shoe 11 is in contact with the supporting surface 16 at point $C_0$.

As tension in the chain increases, a contact point of the distal end portion 15 of the blade shoe is transferred from point $C_0$ on the first supporting surface 16a through a circular, concave surface between points $C_0$ and D to point C on the second supporting surface. The amount of deflection of the blade shoe and thus, the blade spring is increased by $\Delta$, as compared with the state supported on the supporting surface 17 of the prior art. Thereby, increasing the resilient force of the blade spring.

Figure 6:
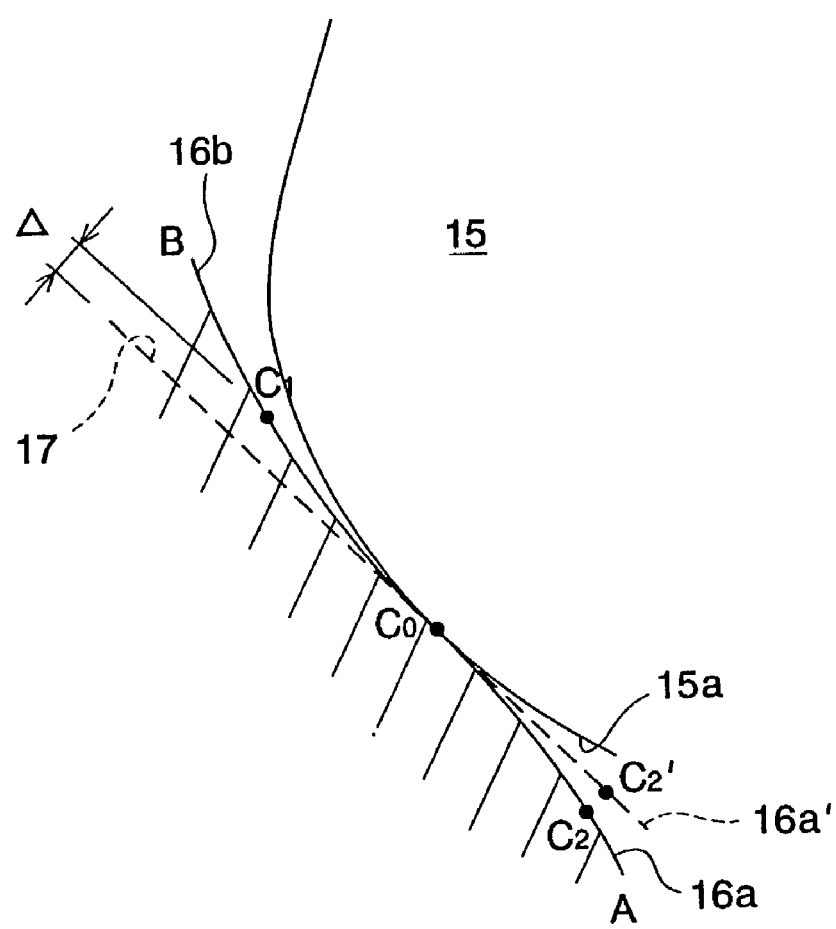
FIG. 6 shows another alternative embodiment of the present invention.

In another alternative embodiment, as shown in FIG. 6, the surface AB composing a supporting surface 16 is formed of a first supporting surface 16a that is a circular, convex surface between point A and point $C_0$ and the circular, concave surface that extends between point $C_0$ and point B and is continuous with the first supporting surface 16a. Point $C_0$, in this embodiment is an inflection point on the supporting surface 16 formed of circular, convex and concave surfaces. The circular, convex surface 15a of the distal end portion 15 of the blade shoe 11 is in contact with point $C_0$ on the supporting surface 16.

As tension in the chain increases, a contact point of the distal end portion 15 of the blade shoe on the supporting surface is transferred from point $C_0$ to point $C_1$. Thereby, the amount of deflection of the blade shoe, and thus, the blade spring is increased by $\Delta$, as compared with the supporting surface 17 of the prior art. As a result, the resilient force of the blade spring is increased.

Furthermore, as the chain elongates and the blade shoe slackens, the distal end portion 15 of the blade shoe moves downwardly along the first supporting surface 16a. When the distal end portion 15 of the blade shoe comes into contact with point $C_2$ on the first supporting surface 16a, the frictional force which acts upon the distal end portion 15 of the blade shoe at point $C_2$ is greater than the frictional force acting upon the distal end portion 15 of the blade shoe at point $C'_2$, which is the contact point between the distal end portion 15 of the blade shoe and the flat supporting surface 16a'.

Figure 7:
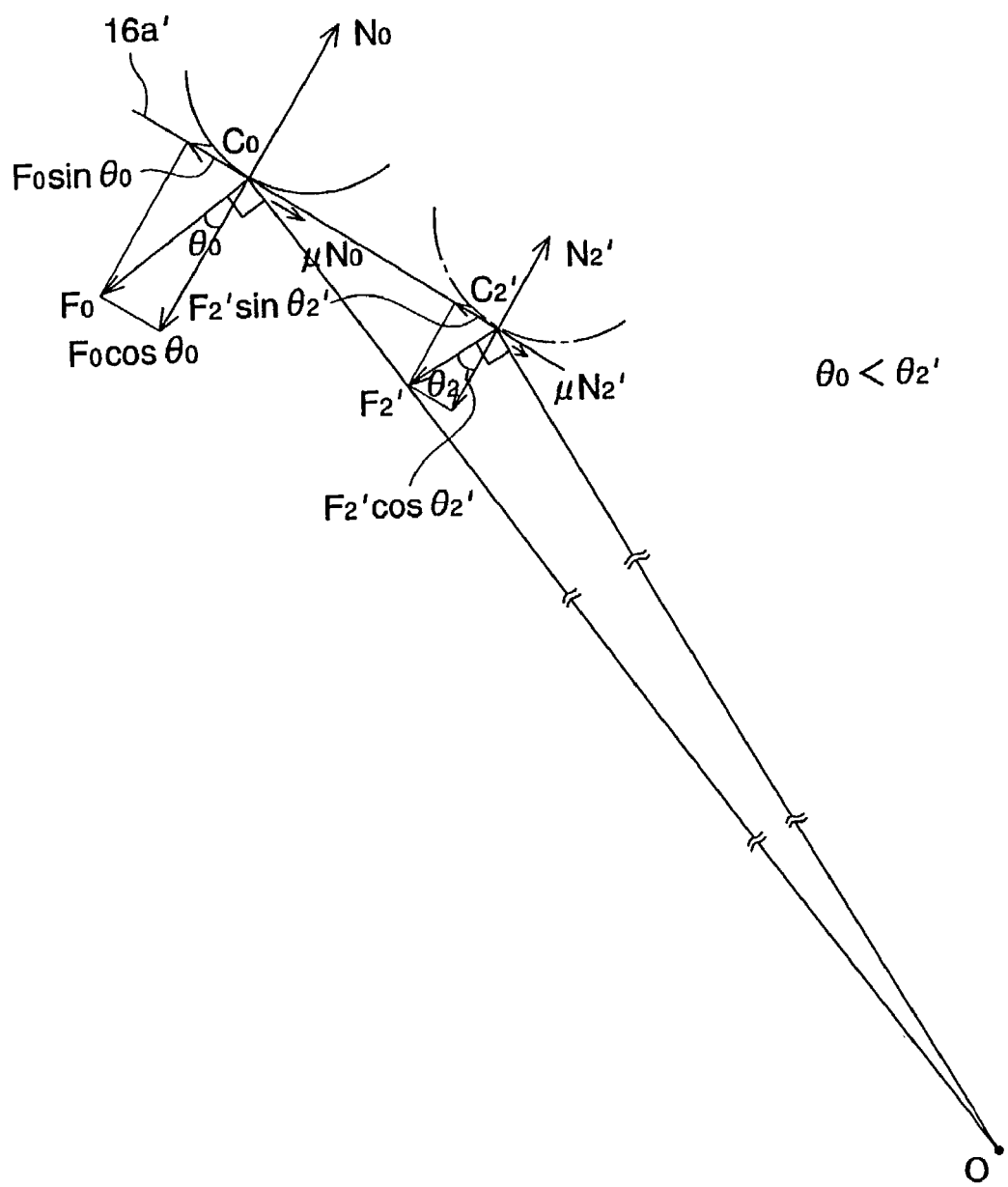
FIG. 7 shows an equilibrium of forces at each contact point between the distal end portion of the blade shoe and the supporting surface of prior art in the case when the chain has elongated from the set position of FIG. 1.

FIG. 7 illustrates the equilibrium of forces at points $C_0$, $C_2'$ on a flat supporting surface 16a'. As shown in FIG. 7, compressive forces of the chain on the blade shoe that are imparted as a reaction of compressive forces of the blade shoe on the chain at points $C_0$, $C_2'$ on the supporting surface 16a' are designated at $F_0$, $F_2'$. The blade spring, which was elastically deformed toward a greater radius of curvature and stayed at point $C_0$, moves toward a smaller radius of curvature by its restoring force and stays at point $C_2'$. As a result, at point $C_2'$, the amount of elastic deformation of the blade spring is decreased and the compressive force of the blade spring to the chain is also decreased. That is, $$F_0 > F_2' \tag{1}$$

The compressive force $F_0$ of the chain at point $C_0$ generates a bending moment $M_0$ (=$F_0 \times OC_0$) to cause rotation of the blade shoe around point O. Similarly, the compressive force $F_2'$ of the chain at point $C_2'$ generates a bending moment $M_2'$ (=$F_2' \times OC_2'$) to cause rotation of the blade shoe around point O. Point O is the center of rotation of the blade shoe, which corresponds to the center of the shoulder bolt 14.

The compressive forces $F_0$, $F_2'$ are resolved into two directions: one is a direction parallel to the supporting surface 16a' and the other is a direction perpendicular to the supporting surface 16a'. The angles formed between the direction perpendicular to the supporting surface 16a' and the directions of action of the compressive forces $F_0$, $F_2'$ are designated at $\theta_0$, $\theta_2'$, respectively.

At point $C_0$, a vertical component of the force $F_0$, or $F_0 \cdot \cos \theta_0$ balances a normal load $N_0$ on the supporting surface 16a'. A horizontal component of the force $F_0$, or $F_0 \cdot \sin \theta_0$ acts to slide the blade shoe along the supporting surface 16a'. A frictional force $\mu N_0$ ($\mu$: coefficient of friction), or $\mu F_0 \cdot \cos \theta_0$ acts in a direction opposite to the direction of $F_0 \cdot \sin \theta_0$ along the supporting surface 16a'.

Similarly, at point $C_2'$, a vertical component of the force $F_2'$, or $F_2' \cdot \cos \theta_2'$ balances a normal load $N_2'$ on the supporting surface 16a'. A horizontal component of the force $F_2'$, or $F_2' \cdot \sin \theta_2'$ acts to slide the blade shoe along the supporting surface 16a'. A frictional force $\mu N_2'$, or $\mu F_2' \cdot \cos \theta_2'$ acts in a direction opposite the direction of $F_2' \cdot \sin \theta_2'$ along the supporting surface 16a'.

Here, $\theta_2' > \theta_0 \cos \theta_2' < \cos \theta_0$ From inequality (1), $$F_2' < F_0 \, \mu F_2' \cdot \cos \theta_2' < \mu F_0 \cdot \cos \theta_0 \text{ That is, } \mu N_2' < \mu N_0' \tag{2}$$

From inequality (2), it is found that the frictional force decreased at point $C_2'$, as compared with the frictional force at point $C_0$.

Figure 8:
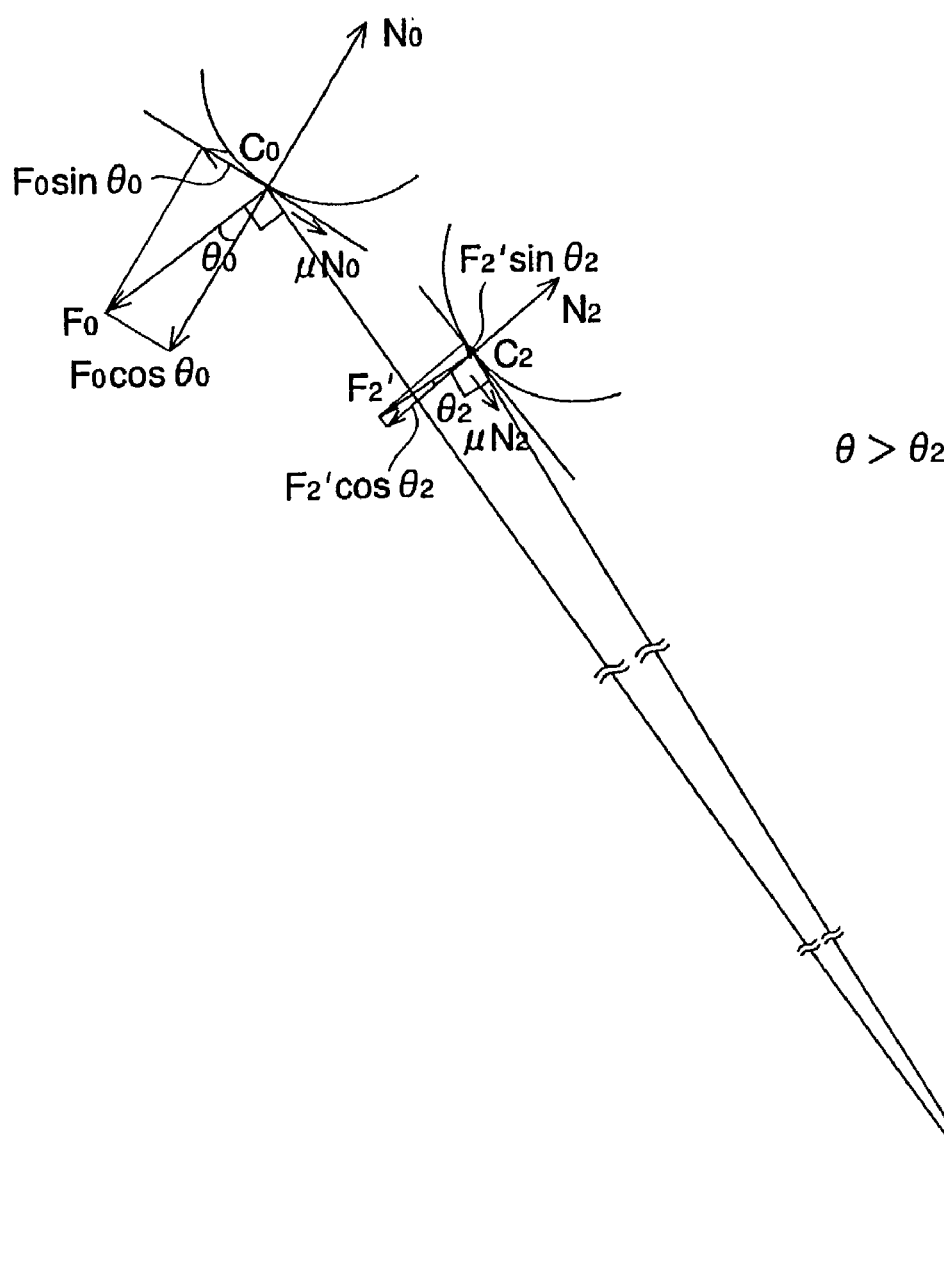
FIG. 8 shows an equilibrium of forces at each contact point between the distal end portion of the blade shoe and the first supporting surface in the case when the chain has elongated from the set position of FIG. 1.

FIG. 8 illustrates the equilibrium of forces at points $C_0$, $C_2$ on the first supporting surface 16a. As shown in FIG. 8, compressive forces of the chain on the blade shoe at points $C_0$, $C_2$ on the first supporting surface 16a are designated at $F_0$, $F_2'$, respectively. The compressive forces $F_0$, $F_2'$ are resolved into a direction tangential to the supporting surface 16a and the other direction perpendicular to the tangential direction of the supporting surface 16a at points $C_0$, $C_2$, respectively. The angles formed between the direction perpendicular to the supporting surface 16a and the directions of action of the compressive forces $F_0$, $F_2'$ are designated at $\theta_0$, $\theta_2$, respectively.

At point $C_0$, a vertical component of the force $F_0$, or $F_0 \cdot \cos \theta_0$ balances a normal load $N_0$ on the supporting surface 16a. A frictional force $\mu N_0$ ($\mu$: coefficient of friction) acts in a direction opposite the direction of action of the horizontal component of the force $F_0$, or $F_0 \cdot \sin \theta_0$.

At point $C_2$, a vertical component of the force $F_2'$, or $F_2' \cdot \cos \theta_2$ balances a normal load $N_2$ on the supporting surface 16a. Friction force $\mu N_2$ acts in a direction opposite to the direction of action of $F_2' \cdot \sin \theta_2$.

In this case as well, $$F_2' < F_0 \text{ and } \mu N_2 < \mu N_0$$

Here, $\theta_2 < \theta_0 < \theta_2'$ $$\cos \theta_2' < \cos \theta_2$$

Therefore, $$\mu F_2' \cdot \cos \theta_2' < \mu F_2' \cdot \cos \theta_2$$

$$\mu N_2' < \mu N_2$$

That is, a frictional force at point $C_2$ is greater than a frictional force at point $C_2'$. In such a way, according to the present invention, even when the chain has elongated, a frictional force acted upon the blade shoe from the supporting surface can be made greater, thereby improving damping performance of the blade tensioner relative to the chain.

In the aforementioned embodiment, an engine of single overhead camshaft type (SOHC) is used, but the present invention can be also applied to an engine of double overhead camshaft type (DOHC). Also, the application of the blade tensioner system of the present invention is not limited to an engine timing system, but this blade tensioner system may be applied to a chain for an auxiliary drive such as an oil pump or the like.

Furthermore, the blade tensioner of the present invention is not limited to the structures shown in FIGS. 1 and 3. Any type of blade tensioners can be used where a blade spring is provided on the opposite side of the chain sliding surface.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A blade tensioner system for a chain, the system including a blade-type tensioner imparting tension to the chain that drivingly connects a driven shaft to a drive shaft in an engine, the blade tensioner comprising:
    a blade shoe having a shoe body with an arcuately curved chain sliding face, a proximal end portion provided on a proximal side of the shoe body, wherein the proximal end portion of the blade shoe is pivotably supported around a supporting shaft inserted into the proximal end portion, and a distal end portion provided on a distal side of the shoe body;
    a blade spring for imparting tension to the chain through the blade shoe, the blade spring being positioned on a back side of the chain sliding face of the blade shoe;
    a first supporting face and a second supporting face provided in the engine so as to slidably support the distal end portion of the blade shoe, the second supporting face having a circular, concave surface that is continuous with the first supporting face; and
    wherein the distal end portion of the blade shoe has a circular, convex surface shaped to conform to being received by the second supporting face, the circular, convex surface of the blade shoe being slidably supported on the first supporting face in the engine and sliding from the first supporting face to the second supporting face, when tension in the chain increases.

2. The blade tensioner system of claim 1, wherein the second supporting face further comprises a flat surface continuous with the circular, concave surface of the first supporting face.

3. The blade tensioner system of claim 1, wherein the first supporting face is a flat surface.

4. The blade tensioner system of claim 1, wherein the first supporting face is a circular, convex surface.

5. The blade tensioner system of claim 4, wherein a contact point between the first supporting face and the circular, convex surface of the distal end portion of the blade shoe is positioned at an inflection point between the circular, convex surface of the first supporting face and the circular, concave surface of the second supporting face.

6. The blade tensioner system of claim 1, wherein the drive shaft is a crankshaft and the driven shaft is a camshaft.

7. The blade tensioner system of claim 1, wherein the drive shaft is a crankshaft and the driven shaft is an auxiliary drive shaft.

* * * * *